Dec. 12, 1961 W. W. MOE 3,013,223

NON-LINEAR IMPEDANCE MODULATION SYSTEM

Original Filed Oct. 18, 1951 8 Sheets-Sheet 1

FIG. I.

INVENTOR.
WILLIAM WEST MOE
BY Brumbaugh, Free
Graves & Donohue
HIS ATTORNEYS.

Dec. 12, 1961 W. W. MOE 3,013,223

NON-LINEAR IMPEDANCE MODULATION SYSTEM

Original Filed Oct. 18, 1951 8 Sheets-Sheet 2

INVENTOR.
WILLIAM WEST MOE
BY Brumbaugh, Free, Graves & Donohue
HIS ATTORNEYS.

NON-LINEAR IMPEDANCE MODULATION SYSTEM

Original Filed Oct. 18, 1951 8 Sheets-Sheet 3

INVENTOR.
WILLIAM WEST MOE
BY Brumbaugh, Free, Graves & Donohue
HIS ATTORNEYS.

INVENTOR.
WILLIAM WEST MOE
BY
HIS ATTORNEYS.

Dec. 12, 1961 W. W. MOE 3,013,223

NON-LINEAR IMPEDANCE MODULATION SYSTEM

Original Filed Oct. 18, 1951 8 Sheets-Sheet 5

INVENTOR.
WILLIAM WEST MOE
BY Brumbaugh, Free, Graves & Donohue
HIS ATTORNEYS.

INVENTOR.
WILLIAM WEST MOE
BY Brumbaugh, Free, Graves & Donohue
HIS ATTORNEYS.

NON-LINEAR IMPEDANCE MODULATION SYSTEM

INVENTOR.
WILLIAM WEST MOE
BY Brumbaugh, Free, Graves & Donohue
HIS ATTORNEYS.

NON-LINEAR IMPEDANCE MODULATION SYSTEM

Original Filed Oct. 18, 1951 8 Sheets-Sheet 8

INVENTOR.
WILLIAM WEST MOE
BY Brumbaugh, Free, Graves & Donohue
HIS ATTORNEYS.

3,013,223
NON-LINEAR IMPEDANCE MODULATION SYSTEM

William West Moe, Stratford, Conn., assignor to Time, Incorporated, New York, N.Y., a corporation of New York Original application Oct. 18, 1951, Ser. No. 251,898, now Patent No. 2,873,312, dated Feb. 10, 1959. Divided and this application July 31, 1958, Ser. No. 752,272
4 Claims. (Cl. 332—52)

The present invention relates to methods and apparatus for making reproductions in color of a colored original. More specifically, it has to do with new and improved electronic methods and means for producing a plurality of color separation means which, when used in combination, enable more faithful color reproductions to be obtained.

This application is a divisional continuation of my copending application Serial No. 251,898, filed October 18, 1951, now U.S. Patent No. 2,873,312, granted February 10, 1959.

Electronic systems have been devised heretofore for producing color separation negatives or the like to be used in color reproduction processes. In a typical apparatus, electro-optical means is employed for scanning elemental areas of colored original to provide a plurality of signals representative of a plurality of primary color components, respectively. In order to enable the advantages of A.C. amplifiers to be availed of, it has been the practice to interrupt the optical scanning beam at a fairly rapid rate to produce corresponding variations in the electric signals. While such systems are effective, they are not entirely satisfactory. For one thing, irregularities in the operation of the interrupter introduce defects in the final reproduction. Further, since the frequency components in the modulating signals are necessarily close to the frequency of interruption, effective separation of a modulation component from a carrier is difficult and necessitates the use of heavy and bulky electrical components.

It is an object of the invention, accordingly, to provide new and improved electronic methods and apparatus for making reproductions in color which are free from the above noted deficiencies of the prior art.

Another object of the invention is to provide new and improved color reproduction methods and apparatus of the above character in which carrier frequencies are employed that are sufficiently far removed from the range of modulation components derived in scanning the colored original to render said modulation components easily separable from a carrier signal containing them.

A further object of the invention is to provide new and improved color reproduction methods and apparatus of the above character which can effectively accommodate with ease a greater number of scanning lines per unit length of the subject than has been practical heretofore.

These and other objects of the invention are attained by providing an electrical carrier signal of relatively high frequency for each of the primary color components into which elemental areas of the original are separated in the scanning operation, and modulating each of said respective carrier signals as a function of a signal derived in scanning the corresponding primary color component of the original. By using means such as electronic oscillator means, for example, to generate the carrier signals, carrier frequencies can be selected that are far removed from the frequencies of the modulation components. Hence, the number of scanning lines per unit length can be very materially increased while maintaining a wide spread between the modulation component frequencies and the carrier frequencies. As a result, the apparatus is relatively simpler in construction than prior art devices yet it enables greater fidelity to be achieved in the final reproduction.

The invention may be better understood from the following detailed description of a representative embodiment thereof, taken in conjunction with the accompanying drawings in which.

*General Description*

Figure 1:
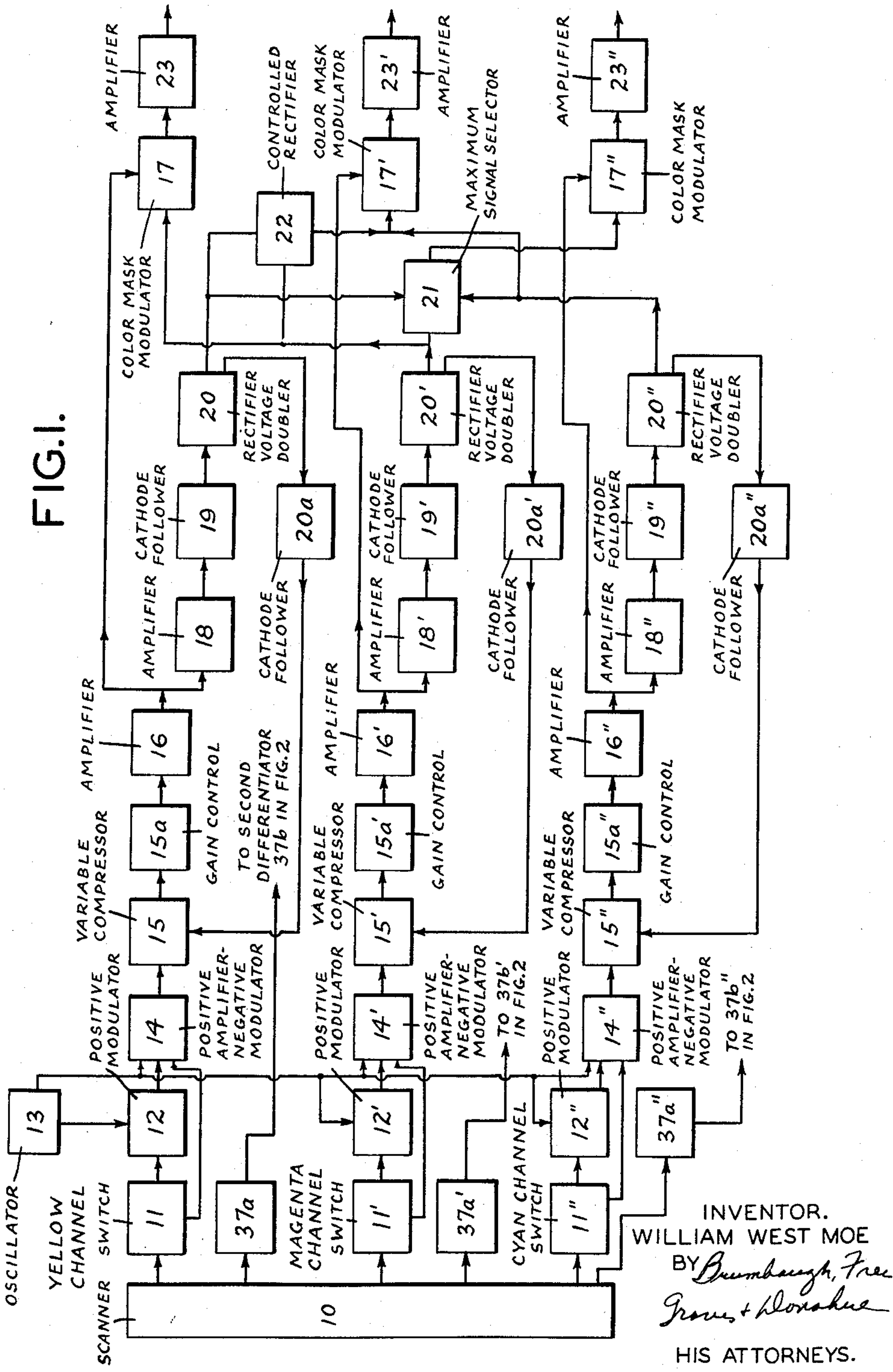
FIG. 1 is a flow diagram illustrating a portion of typical color reproduction apparatus constructed according to the invention extending from the electro-optical scanner to the undercolor removal circuit.

While the invention may be applied to any color reproduction system based upon two or more primary colors, it will be described herein for purposes of illustration in connection with a so-called "four color" system utilizing the three subtractive colors, yellow, magenta and cyan, and black. Before describing the system in detail, a brief general description thereof, with reference to FIGS. 1 and 2, will be given. Referring now to FIG. 1, the box 10 designates conventional scanner mechanism which may be of any suitable type such as that shown in the Murray and Morse Patent No. 2,253,086, for example. Its purpose is to scan elemental areas of a colored original and to provide three electric signals corresponding to the three primary color components in each elemental area scanned.

The three electric signals from the scanner 10, representing the three primary colors, are fed into three electrical channels which will be designated herein the yellow, magenta and cyan channels, respectively, in accordance with the color of the printing plates controlled by the respective channels. Certain elements in each of the three channels are identical. Accordingly, only the yellow channel will be described in detail and corresponding elements in the magenta and cyan channels will be designated by corresponding prime and double prime characters, respectively.

In the yellow channel (FIG. 1), the yellow signal from the scanner 10 is fed first to a switch 11 which is adapted to be set in either of two positions depending on whether the copy to be scanned is in the form of a positive or a negative. With the switch 11 in the position for scanning positives, the scanner output is fed to a positive modulator 12 which also receives a high frequency input of say 150 kilocycles from conventional oscillator means 13. The output of the modulator 12 is amplified in an amplifier 14, the output from which passes through a variable compressor 15 and gain control 15a to the amplifier 16.

With the switch 11 in the position for scanning negatives, the scanner output goes directly to the amplifier 14 which in this case serves as a modulator when switching means (not shown) is actuated, a carrier signal being supplied from the oscillator means 13 to the amplifier 14 for this purpose.

The modulated carrier signals at the output terminals of the amplifiers 16, 16′ and 16″ are then subjected to what may be termed "electronic masking" in which a signal in one channel is modified as a function of a modulation component in the carrier signal from another channel. This is accomplished in the yellow channel by feeding the output of the amplifier 16 to the input terminals of a color mask modulator 17. The modulated output of the amplifier 16 is also fed to an amplifier 18 and through a cathode follower 19 to a conventional rectifier voltage doubler 20, or the like, which provides a D.C. output voltage varying as a function of the modulation carried by the carrier output of the amplifier 16.

The "electronic masking" technique to which one or more of the three carrier signals may be subjected may take different forms, depending upon the results desired. In the system described herein, the masking technique used will be essentially the same as that disclosed in the copending application of William West Moe, Serial No. 231,166, filed June 12, 1951, for "Electronic Masking Method and Apparatus" (now U.S. Patent 2,727,940, granted December 20, 1955). According to this technique, the signal in the cyan channel is masked as a function of the instantaneous maximum of the modulation components in the three channels; the yellow signal is masked as a function of the signal in the magenta channel; and the signal in the magenta channel is masked as a function of the signal in the cyan channel except in yellow areas of the original when it is masked as a function of a combination of the yellow and cyan signals.

Thus, in FIG. 1 the modulating signal applied to the color mask modulator 17 in the yellow channel is a function of the output from the rectifier voltage doubler 20′ in the magenta channel; the modulating signal supplied to the color mask modulator 17″ in the cyan channel is a function of the output of a maximum signal selector 21, to be described later, which receives as inputs the outputs of the rectifier voltage doublers 20, 20′ and 20″; and the modulating signal supplied to the color mask modulator 17′ in the magenta channel is a function of the output of the rectifier voltage 20″ in the cyan channel either alone or in combination with the output of the rectifier voltage doubler 20 in the yellow channel, depending on the condition of a rectifier 22 which normally does not conduct current but which becomes conducting only when yellow areas of the original are being scanned. The output of the color mask modulator 17 is then fed to an amplifier 23, the output of which is supplied to apparatus shown in FIG. 2 for deriving the black signal which controls the exposure of the black separation negative.

Part of the outputs of the rectifier voltage doublers 20, 20′ and 20″ are fed through the cathode followers 20a, 20a′ and 20a″, respectively, to the variable compressors 15, 15′ and 15″ (FIG. 1), and provide control voltages for the latter.

The black separation negative is produced in essentially the same manner as described in the copending application of William West Moe and Vincent C. Hall, Serial No. 14,008, filed March 10, 1948, for "Methods and Apparatus for Making Color Separation Negatives for Four Color Reproductions" (now U.S. Patent 2,605,348, granted July 29, 1952). In the method there disclosed, the black signal is derived by selecting the instantaneous maximum modulation component in each of the three channels and the signals in the three channels are reduced as a function of the black signal in order to effect so-called "undercolor removal." This technique, which involves using black ink to print black or gray areas of the original and reducing the intensities of the three colored inks printed by the amounts of the respective colors which normally combine to form black is well known and need not be described in detail herein.

Figure 2:
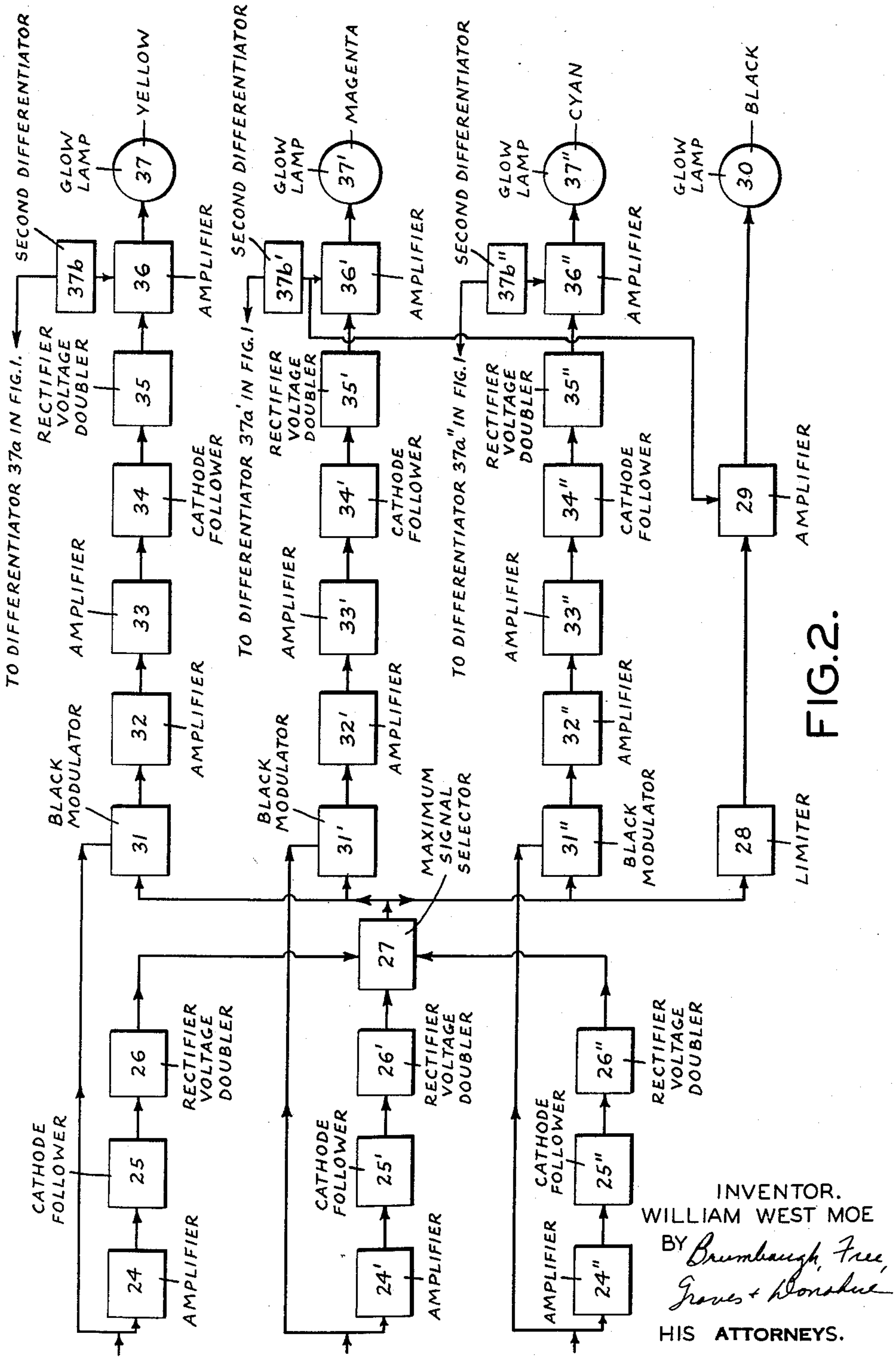
FIG. 2 is a continuation of FIG. 1 showing the portion of the apparatus including the undercolor removal circuit and extending to the illuminating system for exposing the color separation positives or negatives.

As shown schematically in FIG. 2, the output of the amplifier 23 (FIG. 1) is fed to an amplifier 24, the output of which passes through a cathode follower 25 to a rectifier voltage doubler 26. The output of the rectifier voltage doubler 26 is a D.C. signal varying as a function of a modulation component in the yellow channel. The outputs of the rectifier voltage doublers 26, 26′ and 26″ in the three channels are fed to a maximum signal selector 27, to be described below, the output of which is the instantaneous maximum modulation signal component in the three channels. This is fed through a limiter 28 to a conventional amplifier 29, the output of which is used to energize a glow lamp 30 which exposes the black separation negative in the well known manner.

Undercolor removal is effected by feeding the output of the amplifier 23 (FIG. 1) as an input to the black modulator 31 which also receives as an input the instantaneous maximum signal output of the maximum signal selector 27. The output of the black modulator 31, which is the modulated carrier signal in the yellow channel from the amplifier 23 reduced as a function of the black signal from the maximum signal selector 27, is fed through the amplifiers 32 and 33 and the cathode follower 34 to a rectifier voltage doubler 35. The output of the rectifier voltage doubler 35 is a D.C. signal which varies as a function of a modulation component of the modulated carrier from the cathode follower 34. The D.C. signal from the rectifier voltage doubler 35 is fed to an amplifier 36, the output of which energizes a glow lamp 37 which serves to expose the yellow separation negative in the usual manner.

The amplifier 36 also receives a signal from the scanner 10 which is differentiated twice in differentiating circuits 37a (FIG. 1) and 37b (FIG. 2). The differentiated output of the circuits 37a′ and 37b′ in the magenta channel is also fed to the amplifier 29 in the black channel. This is done to restore sharp edges in the reproduction which may have lost their sharpness in transmission through the portion of the signal channel between the scanner 10 and the glow lamps 37, 37′, 37″ and 30.

In operation, the glow lamps 37, 37′, 37″ and 30 expose the yellow, magenta, cyan and black color separation positives or negatives, respectively, in synchronism with the scanning of the colored original by the scanner 10.

*The carrier modulation system*

Figure 3:
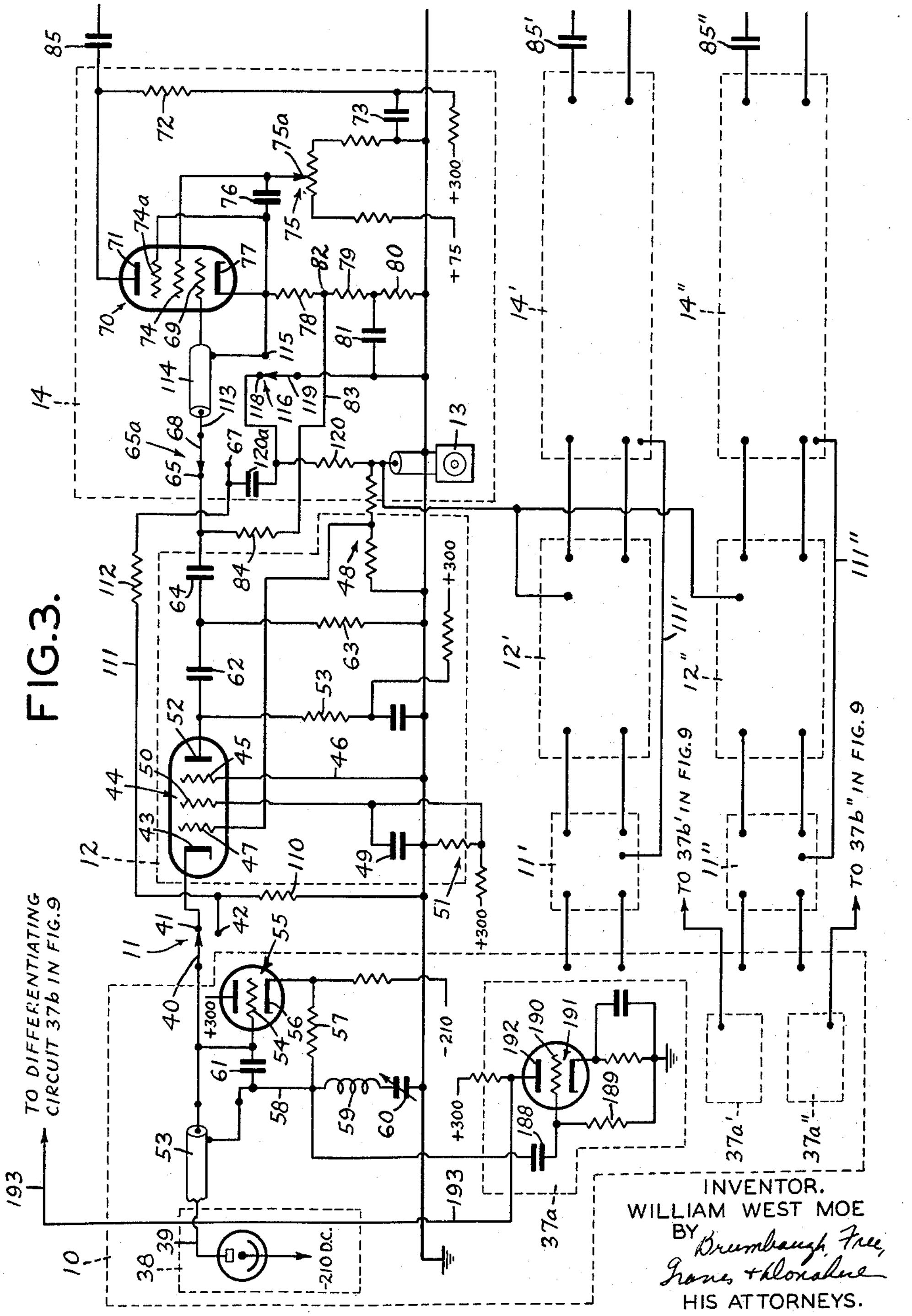
FIG. 3 illustrates schematically a portion of the apparatus shown in FIG. 1 from the optical scanner to the output of the modulating system.

The details of the portion of the representative system, from the scanner 10 up to the electronic masking system are shown in FIG. 3. Considering now FIG. 3, the yellow channel receives its input from a photosensitive device 38 such as a conventional photomultiplier tube, for example, which forms part of the scanner 10. The photomultiplier tube circuit is arranged so that a negative voltage of say minus 210 volts D.C. is applied to the cathode and dynode elements, while the multiplier anode is connected by a shielded lead 39 to the movable contact 40 of the switch 11 which has two fixed contacts 41 and 42 leading to circuits for use when photographic positives and negatives, respectively, are to be scanned.

For scanning photographic positives, the switch 11 is actuated to bring the movable contact 40 into engagement with the fixed contact 41. This connects the lead 39 to the cathode 43 of a conventional electron tube 44 in the modulator 12, which may be a type 6AC7 tube, for example, the suppressor grid 45 of which is connected by a conductor 46 to ground, as shown. The control grid 47 of the tube 44 receives an RF carrier signal at a frequency of say 150 kc., for example, from a suitable source such as a voltage divider 48 connected to receive the output of a conventional RF oscillator 13. The screen grid 50 of the tube 44 is maintained at a suitable positive potential in any suitable manner as by means of a conventional voltage divider 51 connected to a source of voltage (not shown), and is by-passed to ground by a condenser 49 in the usual manner. The plate 52 of the tube 44 is connected to a suitable source of plate voltage (not shown) through a plate load resistor 53.

In order to eliminate capacity loading, the metal cable sheath 53 for the lead 39 is preferably driven at the modulation frequencies. To this end, the input at the lead 39 is fed to the control grid 54 of a conventional electron tube 55 which is connected as a cathode follower in the well known manner. The output of the tube 55 is supplied from the cathode 56 thereof through a resistor 57 and a lead 58 to the sheath 53, a series resonant circuit comprising an inductance 59 and a variable capacitance 60 being connected between the lead 58 and ground to remove 150 kc. signals from the cable sheath 53. Preferably, a condenser 61 is connected between the lead 58 and the control grid 54 of the tube 55 for the purpose of reducing 150 kc. signals on the cathode 43 of the modulator tube 44.

In operation, the tube 44 and the circuit elements connected thereto operate as an electronic chopper or modulator, and provide an output at the plate 52 of the tube which is a 150 kc. carrier signal modulated as a function of the signals received from the lead 39. In a typical system, the plate current of the photomultiplier tube 38 in the scanner 10 may be modulated by the colored original being scanned to frequencies as high as 6,000 cycles per second so that the 150 kc. signal output from the plate 52 of the tube 44 will contain corresponding frequency components.

The output from the plate circuit of the tube 44 is filtered by a conventional RC filter comprising the series capacitance 62 and a shunt resistance 63 and is fed through a condenser 64 to one fixed contact 65 on a switch 65*a* which also has another fixed contact 67 to be used when photographic negatives are to be scanned, as will be described in greater detail hereinafter. For scanning positives, the fixed contact 65 is engaged by the movable contact 68 of the switch 65*a*, thus connecting the filtered output of the tube 44 to the control grid 69 of a conventional electron tube 70 in the amplifier 14. The plate 71 of the tube 70 is connected through a load resistor 72 to a suitable source of voltage (not shown), a by-pass condenser 73 to ground being provided in accordance with the usual practice. The suppressor grid 74*a* is tied to the cathode 77 as shown. The screen grid 74 of the tube 70 is maintained at a suitable positive potential in any conventional manner as by a voltage divider 75 connected to a suitable regulated source of voltage, as shown, a by-pass condenser 76 being connected between the screen grid 74 and the cathode 77 of the tube 70.

In order to reject low frequency modulation products in the input to the control electrode 69 of the tube 70, selective degeneration is provided for in the input circuit of the tube 70. Thus, the cathode 77 of the tube 70 is connected through the resistors 78, 79 and 80 to ground, a condenser 81 being connected in shunt with the resistor 80. The condenser 81 is selected to have substantial reactance at the modulation frequencies but negligible impedance at the carrier frequency. The midpoint 82 between the resistors 78 and 79 is connected by a conductor 83 through a resistor 84 to the fixed contact 65 of the switch 11 so that when the latter is in the position shown, connection is made to the control grid 69 of the tube 70. With this construction, the amplifier circuit comprising the tube 70 and the elements associated therewith will pass the modulated 150 kc. carrier signal but will reject low frequency modulation products in the output of the tube 44.

Figure 4:
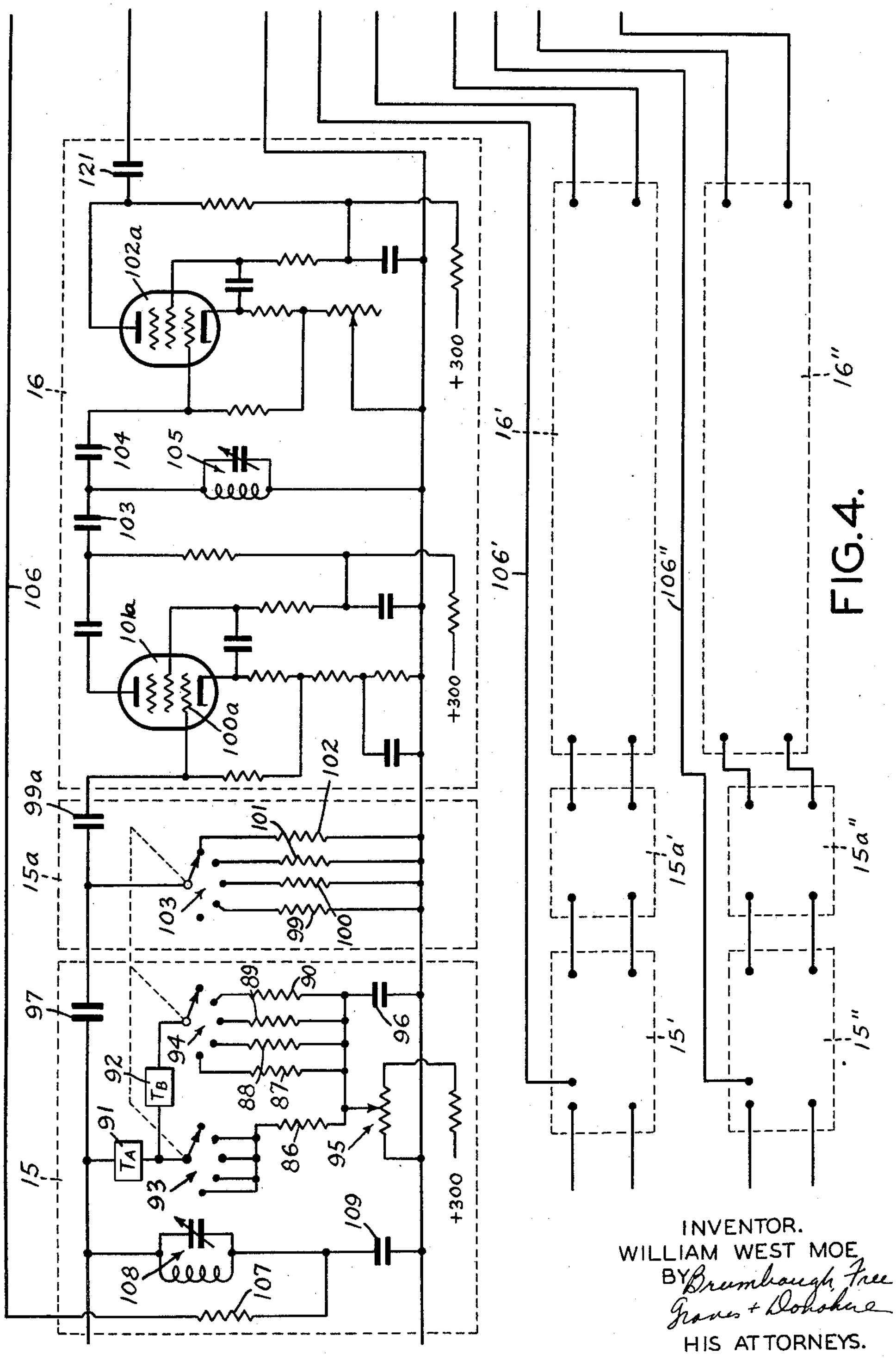
FIG. 4 is a schematic diagram of another portion of the apparatus shown in FIG. 1 including a variable compressor, gain control and amplifier means.

The amplified output of the tube 70 is fed from the plate circuit thereof through a blocking condenser 85 to the variable compressor 15. The compressor 15 may comprise, for example, a plurality of linear resistors 86, 87, 88, 89, 90, and nonlinear devices such as the thyrite resistors 91 and 92, for example, connected to the gang operated switches 93 and 94, as shown in FIG. 4. Suitable values are selected for the linear and nonlinear resistances, in accordance with good engineering practice, so as to enable various degrees of compression, say from 10 to 1 to unity, to be selected by ganged operation of the switches 51 and 52. Preferably the values are selected so that the output voltage will vary from about 1 volt to about 50 volts on each range.

Bias for the compressor 15 may be provided by any suitable means such as, for example, a conventional voltage divider 95 connected to a suitable source of voltage, as shown, and a by-pass condenser 96 may be connected in shunt with the source of biasing voltage, as shown. Also, a D.C. compression control voltage derived from the signal at a subsequent point in the yellow channel in a manner to be described below, is fed to the compressor 15 through a conductor 106, a resistor 107, and a parallel resonant circuit 108 resonating at 150 kc., a condenser 109 being connected between the latter and ground. The D.C. compression control signal, which is considerably larger than the A.C. input signal to the compressor 15, controls the impedance of the latter.

The output from the variable compressor 15 is fed through a condenser 97 to a gain control device 15*a* which may comprise, for example, a plurality of linear resistances 99, 100, 101 and 102 connected to the contacts of the switch 103 which is operated in ganged relationship with the switches 93 and 94. From the gain control device 15*a*, the signal is fed through a condenser 99*a* to the control grid 100*a* of an electron tube 101*a* in the amplifier 16. The amplifier 16 may comprise, for example, the tubes 101*a* and 102*a* and the electrical components connected thereto, a filter comprising the series condensers 103 and 104 and the tuned circuit 105 resonating at 150 kc. being provided to filter out any harmonics generated in the modulation process. The output of the amplifier 16 is then fed to the portion of the system shown in FIG. 5 in which electronic masking is effected.

When photographic negatives are to be scanned (FIG. 3), the switch 11 is actuated to bring the movable contact 40 thereof into engagement with the fixed contact 42. This impresses the input from the lead 39 across an impedance 110 which is shown as a linear resistance, although it may be desirable to employ a selected nonlinear impedance in order to secure specified negative modulator characteristics for operation under these conditions. The signal developed across the impedance 110 is fed through a conductor 111 and a resistor 112 to the fixed contact 67 of the switch 65*a* in the amplifier 14 which also serves as a negative modulator when the movable switch contact 68 is moved into engagement with the contact 67. Thus, with the switches 11 and 65*a* in the positions described for scanning photographic negatives, the modulator 12 is by-passed and the signal input at the lead 39 is fed by a conductor 113 connected to the movable contact 68 of the switch 65 to the control grid 69 of the tube 70.

The conductor 113 is provided with the usual metal shield 114 which is connected to the cathode 77 of the tube 70 and to a fixed contact 115 of a switch 116 having another fixed contact 118 and a movable contact 119. When positives are being scanned as described above, the movable contact 119 is placed in engagement with the fixed contact 118 thereby grounding one end of a resistor 120 in the supply lead from the oscillator 13. For scanning negatives, the movable contact 119 of the switch 116 is moved into engagement with the fixed contact 115 which acts to short circuit the resistors 78, 79 and 80. Disengagement of the switch contacts 118 and 119 removes the ground from the end of the resistor 120 and permits the 150 kc. carrier signal from the oscillator 13 to be fed through the condenser 120a to the contact 67 on the switch 65a, and thus to the control grid 69 of the tube 70. Under these conditions of operation, the adjustable tap 75a on the voltage divider 75 serves as a range adjustment for the negative modulator comprising the tube 70 and the elements associated therewith when the switches 65a and 116 are in the positions described.

*The color masking system*

From the plate of the tube 102a, the output of the amplifier 16 is fed through the condensers 121 and 122 (FIG. 5) to the control grid 123 of an electron tube 124 in the amplifier 18. The output of the amplifier 18 is fed to the high frequency cathode follower circuit 19, the output of which is demodulated in the rectifier voltage double circuit 20. The demodulated output of the rectifier voltage doubler circuit 20 is impressed on the control grid 185 of a conventional electron tube 186 connected as a cathode follower. The ouput at the cathode 187a of tube 186 is fed through the resistor 187, the conductor 106 (FIG. 4) and the resistor 107 to the variable compressor 15, for which it serves as a compression control voltage.

As stated above, the signal in the yellow channel is masked as a function of the modulation component in the magenta channel. This is accomplished by feeding the output of the rectifier voltage double 20' through a conductor 125 to the control grid 126 of a conventional electron tube 127 connected as a cathode follower. The output from the cathode 128 of the tube 127 is filtered in a conventional filter comprising the shunt condensers 129 and 130 and a parallel tuned circuit 131 in series to remove any traces of the carrier frequency and to pass only a modulation component including frequencies in the range from say zero to 6,000 cycles per second. The filtered output is fed through a resistor 132 and a tuned circuit 133 resonant at 150 kilocycles to a thyrite network 134 which also receives the output of the amplifier 16 (FIG. 4) through a conductor 134a and a condenser 135. The thyrite network 134 and the condenser 135 constitute a modulation system of the type disclosed in the applicant's copending application Serial No. 108,290, filed August 3, 1949, for "Modulation Systems," now United States Patent 2,580,692, granted January 1, 1952. Note that the series combination of condenser 135 and network 134 forms a voltage divider means which enables the variations in impedance of network 134 as a function of the modulating current to be translated into amplitude modulation of the carrier supplied by lead 134a. Note also that condenser 135 acts as a blocking condenser to prevent the variable D.C. modulating signal from by-passing network 134 by way of the lead 134a.

The value of the inductance 136 in the tuned circuit 133 is chosen so as to tune out the small capacitance associated with the thyrite network 134. To this end, the junction of resistor 132 and tuned circuit 133 is connected to ground by the R.F. by-pass condenser 136a. The advantage of tuning out the capacitance associated with network 134 is that it avoids the loss of modulation of the carrier which would result if such capacitance were to be effectively in parallel with network 134 and in series with condenser 135 to (*a*) provide a carrier current path, shunting network 134, in which there would be no modulating action, and (*b*) to have a voltage dividing action with condenser 135 so that the R.F. voltage across network 134 would be lowered. As another advantage of tuned circuit 133, it acts as an input circuit for network 134 which presents a low impedance to the modulating current to permit such current to be applied to network 134 with minimum loss in the input circuit, while, at the same time, the tuned circuit 133 presents a very high impedance to the carrier to thereby prevent any appreciable fraction of the carrier on lead 134a from by-passing the network 134 by a path through the input circuit therefor.

Figure 6:
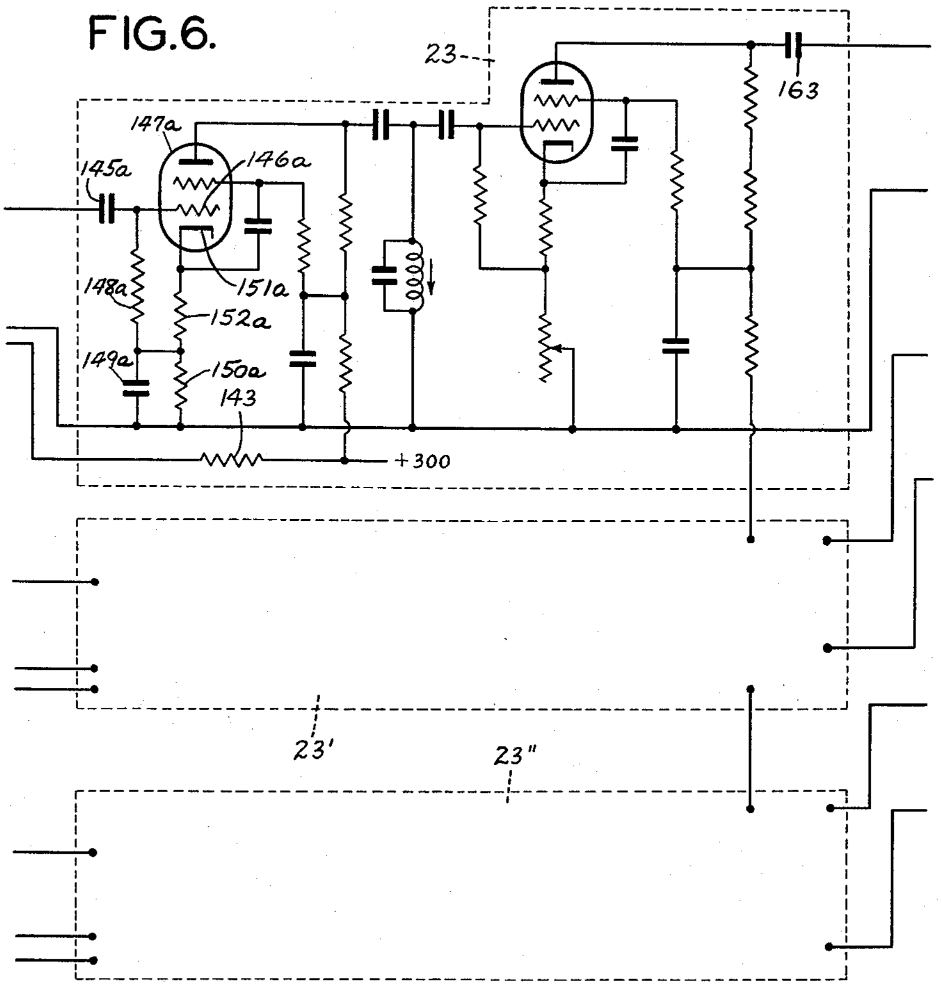
FIG. 6 is a schematic showing of amplifying means which follows the portion of the apparatus illustrated in FIG. 5.
Figure 7:
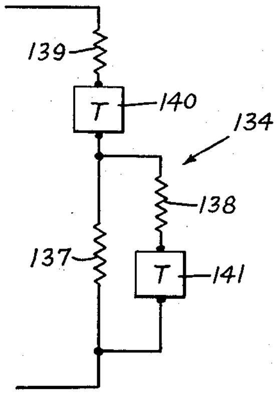
FIG. 7 illustrates schematically a typical nonlinear circuit element which forms part of a modulating system in FIG. 4.

The thyrite network 134 actually comprises a plurality of fixed resistors 137, 138 and 139 and a plurality of thyrite resistors 140 and 141 connected as shown in FIG. 7 and whose values are selected so that the impedance Z of the whole is given by the expression $Z=KI^{-.5}$. The lower end of the thyrite network is connected to an energized voltage divider comprising the resistors 142 and 143 (FIG. 6) which provides bias to cancel out the D.C. signal from the cathode 128 of the tube 127 normally existing under conditions of zero input. The capacitor 143a, connected between network 134 and ground, provides, for both the high frequency carrier and the lower frequency A.C. components of the modulating signal, a path to ground which by-passes the portion of resistor 142 between the variable tap thereon and ground. The capacitor 143a, therefore, permits D.C. bias to be applied to network 134 from resistor 142 while, at the same time, the capacitor avoids the energy loss of carrier signal and modulating signal which would be incurred in the referred to portion of resistor 142 if the only path from network 134 to ground for these signals were through the mentioned portion of resistors 142.

The output of the modulator, which is delivered at the conductor 144a is a 150 kilocycle carrier signal modulated as a function of the D.C. from the lead 39 (FIG. 3) and further modulated as a function of the minus one-half power of the modulation contained in the carrier signal in the magenta channel. From the lead 144a the modulated carrier is supplied by way of a blocking condenser 145a (FIG. 6) to the grid 146a of tetrode 147a in the amplifier stage 23. The grid 146a is connected to ground through the resistor 148a in series with the parallel combination of condenser 149a and resistor 150a, while the cathode 151a of the tetrode is connected to ground through a resistor 152a in series with the mentioned parallel combination.

The condenser 145a passes the modulated carrier while, at the same time, serving to block the D.C. component modulation signal, impressed across network 134, from reaching the grid 146a. Also, capacitor 145a, to an extent, blocks the A.C. frequency components of the modulating signal. However, capacitor 145a cannot be made as small in value as would be ideal for this blocking purpose, since if the capacitor 145a where to have a capacitance value say, equal to or less than the grid cathode interelectrode capacitance of tube 147a, the voltage dividing relation between condenser 145a and the interelectrode capacitance would cause an undesirable attenuation of the strength of the modulated carrier at grid 146a. However, even if condenser 145a does not block all of the modulation signal from reaching grid 146a, the effect of the modulation signal at the grid is further attenuated by the action of the parallel combination of condenser 149a and resistor 150a. This combination in the path of resistor 148a presents a relatively low impedance to the carrier frequency, but a relatively high impedance to the A.C. frequency components of the modulating signal. These A.C. frequency components will accordingly develop across the parallel combination a voltage which is degeneratively fed back through resistor 152a to cathode 151a to there tend to nullify the effect of whatever amounts of the A.C. frequency components of the modulating signal as are impressed on the grid 146a.

Figure 5:
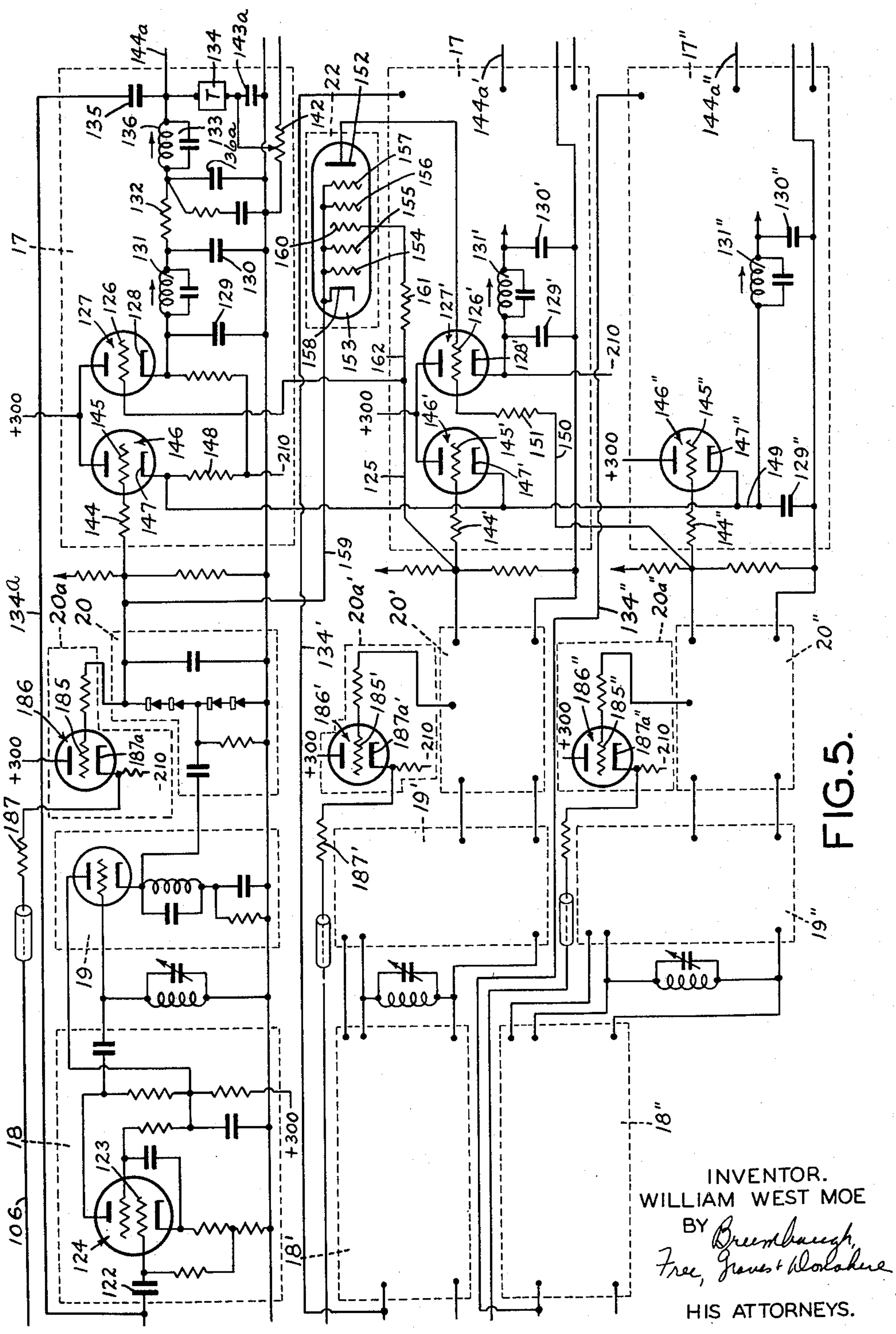
FIG. 5 is a schematic diagram of the portion of the apparatus of FIG. 1 in which electronic masking is effected.

The masking system shown in FIG. 5 also provides for masking the cyan signal as a function of the instantaneous maximum modulation component of the signals in the three channels. This is accomplished by feeding the outputs of the rectifier voltage doublers 20, 20' and 20'' through the resistances 144, 144' and 144'' to the grids 145, 145' and 145'', respectively, of the conventional electron tubes 146, 146' and 146''. The cathodes 147, 147' and 147'' of the latter three tubes are connected together to a common cathode resistor 148 so that the signal appearing at the cathodes 147, 147' and 147'' is the instantaneous maximum modulation component in the three channels. This instantaneous maximum signal is fed through a conductor 149 to a filter network comprising the shunt condenser 129'' and 130'' and the parallel tuned circuit 131'' to a modulator of substantially the same type as that described above in the yellow channel.

In addition to the two masking corrections described above, the signal in the magenta channel is masked as a function of the signal in the cyan channel except in yellow areas of the original, in which case it is masked as a function of a combination of the modulation components in the yellow and cyan channels. To this end, the D.C. signal output from the rectifier voltage doubler 20'' in the cyan channel is fed through a conductor 150 and a resistor 151 to the control grid 126' of the tube 127' in the magenta channel. The grid 126' is also connected to the plate 152 of a conventional multielectrode electron tube 153, the grids 154, 155, 156 and 157 and the cathode 158 of which are connected together and by a conductor 159 to receive the D.C. output of the rectifier voltage divider 20 in the yellow channel. The control grid 160 of the tube 153 is connected through a resistor 161 and the conductors 162 and 125 to receive the D.C. output of the rectifier voltage divider 20' in the magenta channel.

With the foregoing construction, in the absence of sufficiently large positive D.C. signal outputs from the rectifier voltage doublers 20' and 20'', the tube 153 remains nonconducting so that the grid 126' of the tube 127' in the magenta channel receives an input only from the rectifier voltage divider 20'' in the cyan channel. In these circumstances, the signal in the magenta channel is masked only as a function of the modulation in the cyan channel. When, however, there are positive D.C. signal outputs from the rectifier voltage doublers 20' and 20'', as happens when yellow areas of the original are being scanned, the tube 153 becomes conducting and reduces the voltage applied to the grid 126 of the tube 127 from the rectifier voltage doubler 20''. In such case, the signal in the magenta channel is masked as a function of a specified combination of the modulation contained in the signals in the yellow and cyan channels.

Preferably, the system should be designed to give a 50% masking of the magenta from cyan for all colors of the original except yellow, for which a 25% mask of magenta by yellow is desired.

Figure 8:
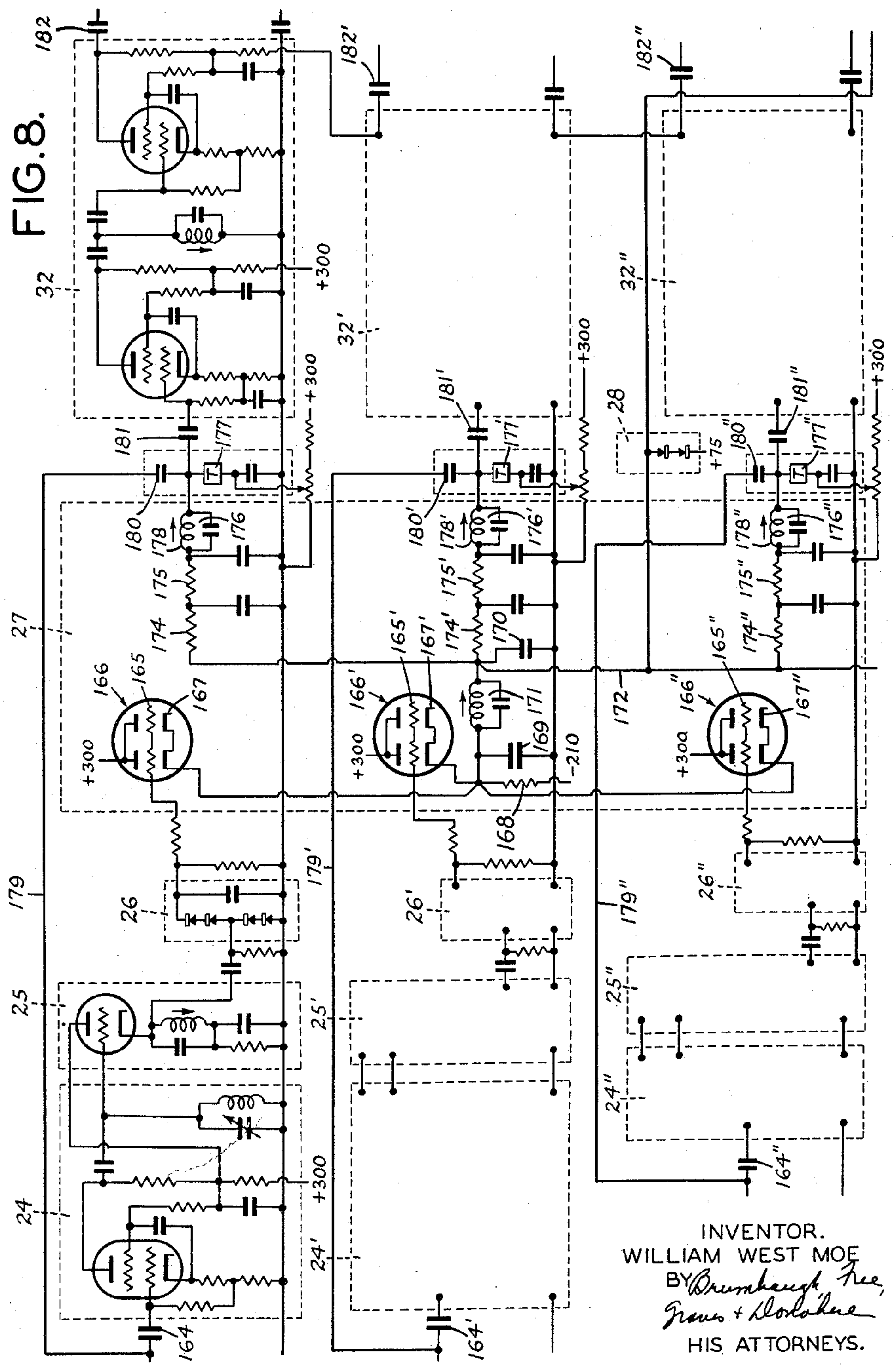
FIG. 8 is a schematic diagram of the portion of the apparatus of FIGS. 1 and 2 in which the black signal is derived and so-caled "undercolor removal" is effected.

After the masking correction has been effected as described above, the color corrected signals in the three channels are fed through the conductors **144*a*, 144*a'* and 144*a''* to the conventional single stage high frequency amplifiers 23, 23' and 23''** (FIG. 6), the outputs of which are then supplied to the "undercolor" removal system shown in FIG. 8 of the drawings.

*The "black signal" and "undercolor removal" system*

Considering again only the yellow channel by way of illustration, the output of the amplifier 23 is fed through the condensers 163 (FIG. 6) and 164 (FIG. 8) to a conventional high frequency amplifier 24, the output of which passes through a high frequency cathode follower 25 to the rectifier voltage doubler 26. The output of the rectifier voltage doubler 26 is fed to the control grid elements 165 of conventional electron tube means 166 which is connected as a cathode follower having cathode elements 167 connected to a cathode resistor 168.

As indicated above, the black signal is derived by selecting the instantaneous maximum modulation component in the three channels. This is effected by connecting the cathode elements 167' and 167'' of the electron tube means 166'' and 167' in the magenta and cyan channels together and to the cathode elements 167 of the electron tube means 166 so that the cathode resistor is common to all three. With this construction, it will be understood that the signal appearing at the cathode element 167 will be the instantaneous maximum of the modulation components in the three channels.

The instantaneous maximum signal taken from the cathode element 167 is fed through a filter network comprising the shunt condensers 169 and 170 and the parallel tuned circuit 171 in series which serves to pass only the modulation components and to reject the carrier frequencies or harmonics thereof. The filtered instantaneous maximum signal is fed through the conductor 172 to suitable limiter means 28 which may comprise a plurality of biased unilaterally conducting devices in series, as shown and to a conventional D.C. amplifier 29 (FIG. 9), the output of which energizes the glow lamp 30 to expose the black separation negative (not shown).

In accordance with the technique described below, each of the signals in the three channels is reduced as a function of the intensity of the black signal. Thus, in the yellow channel the filtered instaneous maximum signal is fed through the resistors 174 and 175 and a parallel tuned circuit 176 to a thyrite network 177 which may be of the type shown in FIG. 7. As in the masking system shown in FIG. 5, the inductance 178 in the tuned circuit 176 serves to cancel out the small capacitance associated with the thyrite network 177. The thyrite network 177 is also connected to the output of the amplifier 23 (FIG. 6) through the conductor 179 and a condenser 180. As in FIG. 5, the thyrite network 177 and the condenser 180 constitute a modulation system in which the modulated carrier from the conductor 179 is modulated as a function of the D.C. signal fed through the tuned circuit 176.

Figure 9:
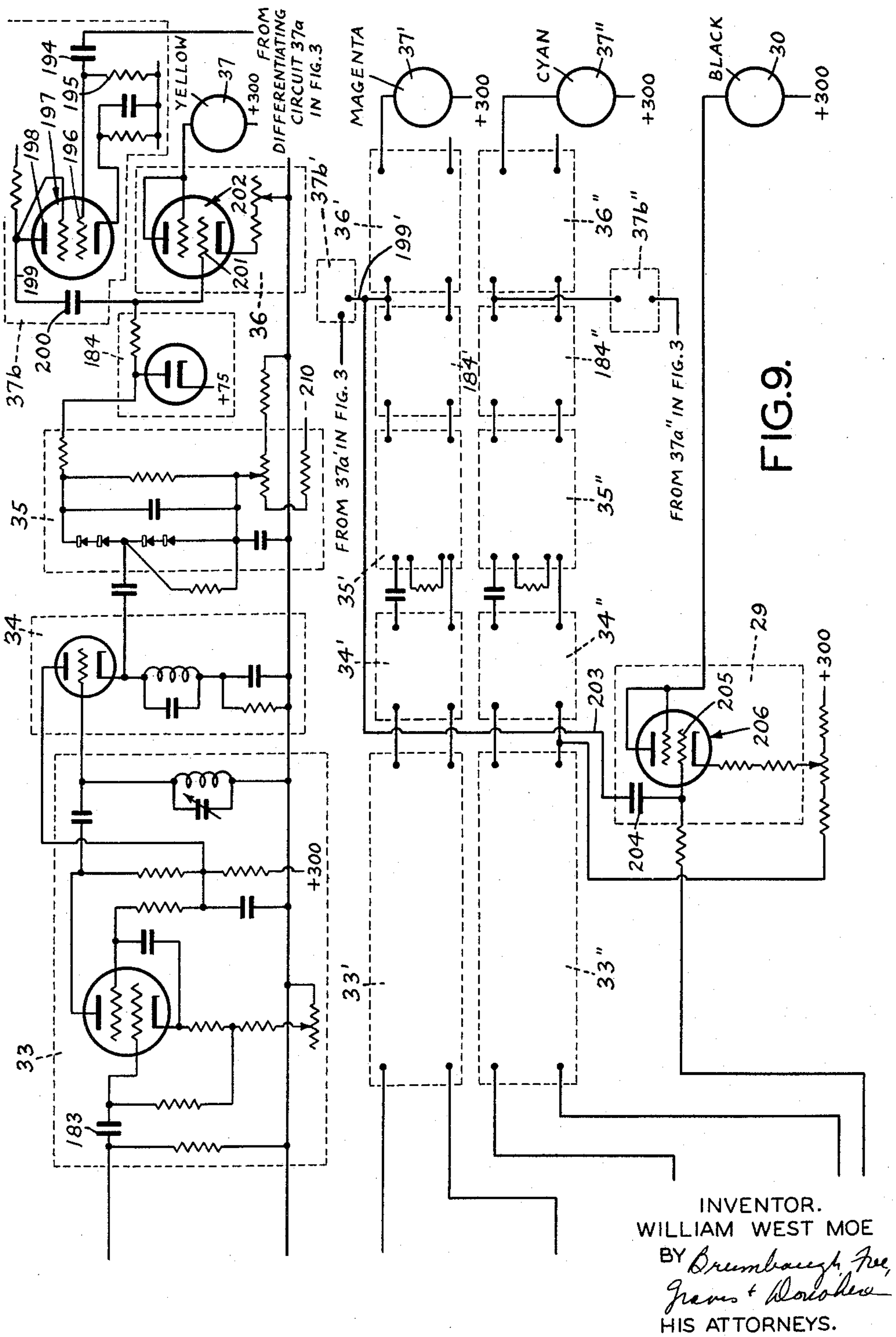
FIG. 9 illustrates schematically the portion of the apparatus of FIGS. 1 and 2 which controls the excitation of the lamps that expose the several photosensitive emulsion means.

The output of the modulator network comprising the thyrite network 177 and the condenser 180 is fed through a condenser 181 to a conventional two stage high frequency amplifier 32, the output of which is fed through the condenser 182 to the printer circuits shown in FIG. 9.

*The printer system*

In FIG. 9, the carrier signal in the yellow channel, corrected for masking and after undercolor removal is fed through a condenser 183 to a conventional high frequency amplifier 33. The output of the amplifier 33 is supplied through a high frequency cathode follower circuit 34 to a rectifier and a voltage doubler device 35, the output of which is fed to a conventional D.C. amplifier 36 which energizes the glow lamp 37 in the yellow channel to expose the yellow color separation negative. Preferably, suitable limiter means 184 is interposed between the rectifier and voltage doubler 35 and the amplifier 36 to limit the maximum current supplied to the glow lamp 37.

Since sharp edges in the original subject being scanned may tend to lose some of their sharpness in transmission through the multiplicity of electronic circuits comprising the apparatus described above, it is desirable to provide means for restoring the sharpness to such edges. This may be accomplished by taking part of the output from the photomultiplier tube 38 (FIG. 3) at the lead 58 and supplying it to a differentiating circuit **37*a* comprising the series condenser 188 and shunt resistor 189. The differentiated signal appearing across the resistor 189 is impressed on the control grid 190 of a conventional electron tube 191 connected as an amplifier in the usual manner. The amplified differentiated signal is taken from the plate 192 of the tube 191 and is fed by a conductor 193 to a second differentiating circuit 37*b* comprising the series condenser 194 (FIG. 9) and shunt resistor 195, the output of which is fed to the control grid 196 of an electron tube 197 connected as a peaking voltage amplifier. The output of the tube 197 is taken from the plate 198 thereof and fed by a conductor 199 through a blocking condenser 200 to the control grid 201 of an electron tube 202 in the D.C. amplifier 36**.

Actually, it is found desirable in practice to so adjust the differentiating circuits 37*a* and 37*b* that overcompensation for the loss of sharpness occurs, i.e., the boundaries between light and dark portions of the picture are overdone so that sharpness is increased. This tends to compensate for loss of picture edges in the halftone printing process.

It has also been found desirable to supply the peaking voltage from the conductor 199' in the magenta channel through a conductor 203 and condenser 204 to the control grid 205 of an electron tube 206 in the black printer amplifier 29.

In operation, a colored original is scanned by the scanner 10 (FIG. 3) in the usual manner and the three signals produced in the scanning operation are subjected to masking corrections and to undercolor removal, as described above, to produce three color corrected signals for energizing the glow lamps to expose the yellow, magenta and cyan negative or positive and a black signal to expose the black separation negative or positive.

From the foregoing description, it will be apparent that the invention provides a novel, highly effective electronic system for making reproductions in color of a colored original. By providing high frequency carrier signals in each of the channels and modulating those signals in accordance with the signals produced in the scanning operation, the desired masking corrections and the modifications required for undercolor removal may be effected in a much simpler and more effective manner than has been possible heretofore. Further, since the use of a high frequency carrier enables a very wide spread to be maintained between the range of modulation frequencies and the carrier frequency, the number of lines scanned per unit of length and per unit of time can be very materially increased quite readily, thus enabling a marked improvement in the fidelity of the reproductions to be achieved with a reduction in the time required for the preparation thereof.

The specific embodiment shown in the drawings and described in the specification is obviously susceptible of modification within the spirit of the invention. A wide range of equivalent elements will occur to those skilled in the art in place of the various components of the system disclosed herein. The specific embodiment described, therefore, is to be regarded merely as illustrative and not as restricting the scope of the following claims.

I claim:

1. A modulation system comprising, voltage divider means comprised of a capacitance and a non-linear, solid state resistor element serially coupled with said capacitance and presenting an impedance adapted at a constant temperature to vary as a function of current through said impedance, means to apply a high frequency carrier signal to be modulated across said voltage divider means, a parallel tuned circuit connected across a portion of said voltage divider means which includes said non-linear element and which excludes said capacitance, said tuned circuit being adapted to present a high impedance to said carrier while presenting a low impedance to a modulating signal characterized by low frequency components, and a modulating signal source connected by way of said tuned circuit in a direct current circuit with said non-linear element, and adapted to apply said modulating signal through said tuned circuit across said non-linear element, said modulating signal being adapted to vary the impedance presented by said non-linear element to produce amplitude modulation of said carrier by said signal.

2. A modulating system as in claim 1 in which said tuned circuit is tuned to resonate at carrier frequency with capacitance associated with said non-linear element to thereby neutralize said associated capacitance at carrier frequency.

3. A modulation system comprising, voltage divider means comprised of a capacitance and a non-linear, solid state resistor element serially coupled with said capacitance means and presenting an impedance adapted to vary as a function of current through said element, means to apply a high frequency carrier signal to be modulated across said voltage divider means, a modulating signal source connected with said voltage divider means to apply a modulating signal across a portion of said voltage divider means which includes said non-linear element and which excludes said capacitance, said modulating signal being adapted to vary the impedance presented by said non-linear element to produce amplitude modulation of said carrier by said signal, and a tuned circuit coupled with said non-linear element to resonate at carrier frequency with capacitance associated with said element to thereby neutralize said associated capacitance at said carrier frequency, said tuned carcuit being interposed between said non-linear element and said modulating signal source.

4. A modulation system comprising, a non-linear element presenting an impedance adapted to vary as a function of current through said element, means to apply a low frequency modulating signal as a variable voltage across said element to vary said impedance as a function of said modulating signal, means to produce across said element a variable voltage in the form of a high frequency carrier modulated in accordance with the impedance variations of said element, an amplifying device having a control electrode, means to couple the voltage variations developed across said element to said control electrode, and degenerative feedback means selectively responsive to the low frequency voltage variations developed by said modulating signal as distinguished from the high frequency voltage variations constituting said modulated carrier to render said low frequency voltage variations at least partially ineffective at said control electrode to control said amplifying device.

References Cited in the file of this patent

UNITED STATES PATENTS

| | | |
|---|---|---|
| 1,416,077 | Tanner | May 16, 1922 |
| 2,191,315 | Guanella | Feb. 20, 1940 |
| 2,294,908 | Hussey | Sept. 8, 1942 |
| 2,419,615 | Weldon | Apr. 29, 1947 |
| 2,449,413 | Rich | Sept. 14, 1948 |